(12) United States Patent
Kubota (10) Patent No.: US 11,210,558 B2
(45) Date of Patent: Dec. 28, 2021

(54) IMAGE FORMING APPARATUS AND IMAGE FORMING SYSTEM

(71) Applicant: Hajime Kubota, Kanagawa (JP)

(72) Inventor: Hajime Kubota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 237 days.

(21) Appl. No.: 16/272,006

(22) Filed: Feb. 11, 2019

(65) Prior Publication Data

US 2019/0279034 A1    Sep. 12, 2019

(30) Foreign Application Priority Data

Mar. 12, 2018 (JP) .............................. JP2018-044803

(51) Int. Cl.
*G06N 3/04*   (2006.01)
*G06K 9/62*   (2006.01)

(52) U.S. Cl.
CPC ................... *G06K 9/6256* (2013.01)

(58) Field of Classification Search
CPC ............. G06F 17/00; G06F 2209/5019; G06F 2209/503; G06F 2216/03; G06F 9/505; G06F 9/5055; G06F 16/90344; G06F 16/9577; G06F 12/0802; G06F 12/0862; G06F 13/1621; G06F 13/26; G06F 2212/1024; G06F 2212/6022; G06F 9/4843; G06F 9/5044; Y10S 707/99933; Y10S 707/99953; Y10S 707/99936; H04W 40/246

See application file for complete search history.

(56) References Cited

U.S. PATENT DOCUMENTS

| | | | |
|---|---|---|---|
| 6,912,533 B1 * | 6/2005 | Hornick .................. | G06F 9/505 |
| | | | 707/700 |
| 2014/0325526 A1 | 10/2014 | Nagata et al. | |
| 2015/0156353 A1 | 6/2015 | Kubota | |
| 2015/0242754 A1 | 8/2015 | Fukuda et al. | |
| 2016/0127574 A1 | 5/2016 | Kubota | |
| 2016/0234092 A1 * | 8/2016 | Avery ..................... | H04L 43/16 |
| 2017/0039077 A1 | 2/2017 | Kubota | |
| 2017/0126919 A1 | 5/2017 | Kubota | |
| 2017/0330056 A1 * | 11/2017 | Merhav ................ | G06N 3/0454 |
| 2019/0220703 A1 * | 7/2019 | Prakash ................. | G06N 20/00 |
| 2020/0018540 A1 * | 1/2020 | Hwang .............. | G05B 13/0265 |

FOREIGN PATENT DOCUMENTS

| | | |
|---|---|---|
| JP | 2013-003798 | 1/2013 |
| JP | 2015-161745 | 9/2015 |
| JP | 2016-058798 | 4/2016 |
| JP | 2017-068038 | 4/2017 |
| JP | 2017-157234 | 9/2017 |

* cited by examiner

*Primary Examiner* — Quan M Hua
(74) *Attorney, Agent, or Firm* — Harness, Dickey & Pierce, P.L.C.

(57) ABSTRACT

An image forming apparatus includes a communication interface through which the image forming apparatus communicates with a server and circuitry. The circuitry is configured to: collect learning data; and determine whether to generate a learning model by the server based on the collected learning data or to generate a learning model by the circuitry based on the collected learning data.

10 Claims, 7 Drawing Sheets

IMAGE FORMING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2018-044803, filed on Mar. 12, 2018, in the Japan Patent Office, the entire disclosure of which is hereby incorporated by reference herein.

BACKGROUND

Technical Field

The present disclosure relates to an image forming apparatus and an image forming system.

Description of the Related Art

Conventionally, image forming apparatuses having a learning function are known. For example, an image forming apparatus having a function to learn sounds from the apparatus and automatically determine a normal sound and an abnormal sound has been proposed. Setting and operation of an image forming apparatus can be automatically improved by installing a learning function in the image forming apparatus.

SUMMARY

According to one or more embodiments, an image forming apparatus includes a communication interface through which the image forming apparatus communicates with a server and circuitry. The circuitry is configured to: collect learning data; and determine whether to generate a learning model by the server or to generate a learning model by the circuitry.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure will be described below with reference to the accompanying drawings. Constituent elements having substantially the same functional configurations are denoted by the same reference numerals to omit redundant description with respect to description of the specification and the drawings according to the embodiments.

First Embodiment

Figure 1:
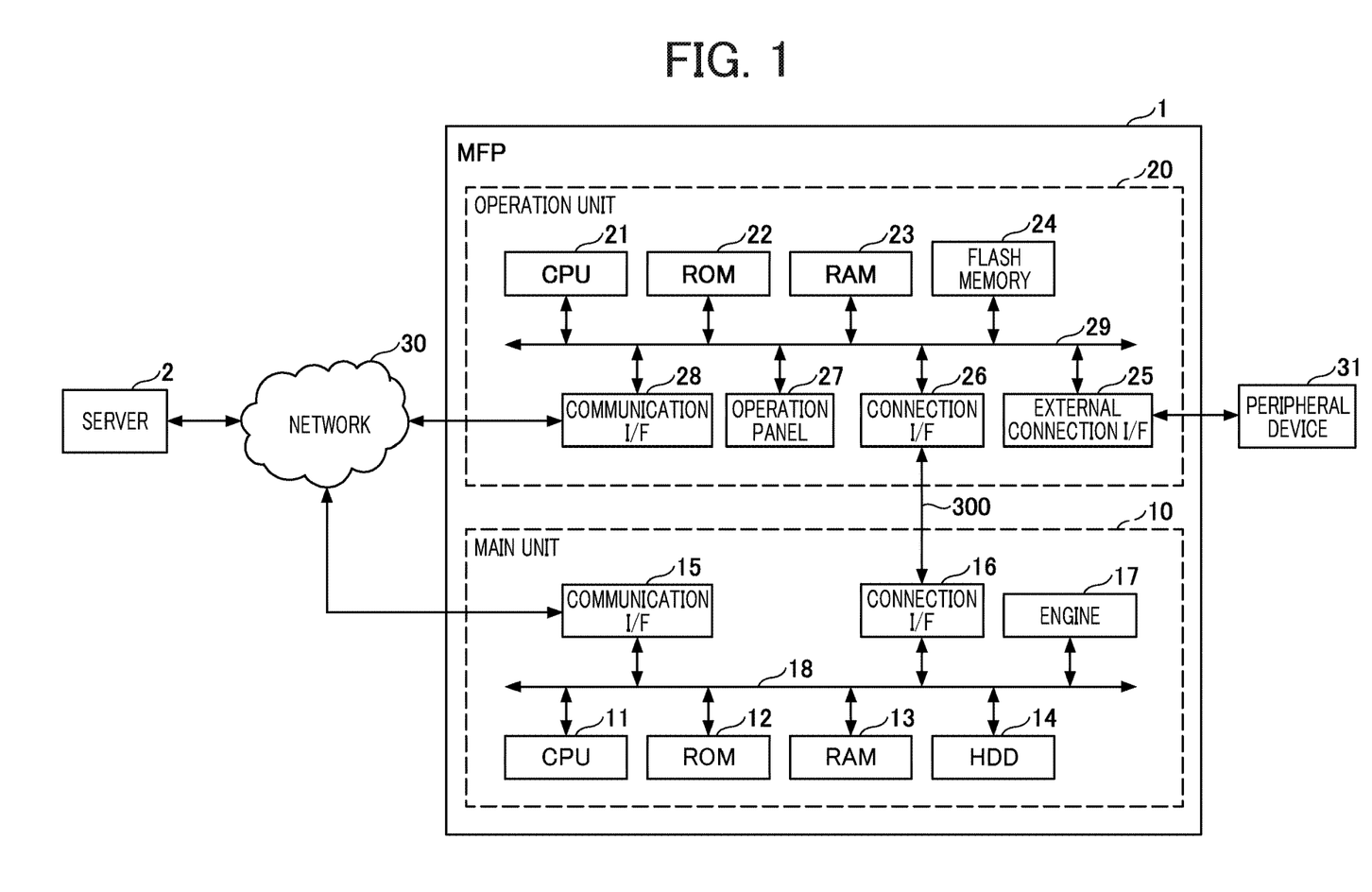
FIG. 1 is a diagram illustrating an example of an image forming system, according to an embodiment of the present disclosure.

An image forming system according to a first embodiment will be described with reference to FIGS. 1 to 5. FIG. 1 is a diagram illustrating an example of an image forming system according to the present embodiment. The image forming system of FIG. 1 includes an image forming apparatus 1 and a server 2 connected via a network 30. In the example of FIG. 1, the image forming system includes one image forming apparatus 1. In another example, the image forming system can include a plurality of image forming apparatuses 1. The image forming apparatus 1 is an arbitrary apparatus having an image forming function, and is, but it is not limited to, a multifunction peripheral (MFP), a copy machine, a printer, a facsimile, or a scanner. Hereinafter, a description is given of an example in which the image forming apparatus 1 is an MFP.

First, a hardware configuration of the MFP 1 will be described. The MFP 1 in FIG. 1 includes a main unit 10 capable of implementing various functions such as a copy function, a scanner function, a facsimile function, and a printer function, and an operation unit 20 that receives a user operation. Note that receiving a user operation is a concept including reception of information (including a signal indicating a coordinate value on a screen or the like) input according to an operation of a user. The main unit 10 and the operation unit 20 are communicatively connected with each other through a dedicated communication path 300. The standard of the communication path 300 is, but not limited to, a universal serial bus (USB), for example. As the standard of the communication path 300, an arbitrary standard of a wired or wireless communication path can be used. Note that the main unit 10 can perform an operation according to an operation received in the operation unit 20. Further, the main unit 10 can communicate with an external device such as a personal computer (PC), and can also perform an operation according to an instruction received from the external device.

The main unit 10 includes a central processing unit (CPU) 11, a read only memory (ROM) 12, a random access memory (RAM) 13, and a hard disk drive (HDD) 14. Further, the main unit 10 includes a communication interface (I/F) 15, a connection I/F 16, an engine 17, and a system bus 18.

The CPU 11 generally controls the operation of the main unit 10. The CPU 11 executes a program stored in the ROM 12 or the HDD 14, using the RAM 13 as a work area, to control entire operation of the main unit 10 to implement the various functions such as the copy function, the scanner function, the facsimile function, and the printer function.

The communication I/F 15 is an interface for connecting the main unit 10 to the network 30 such as the Internet or a local area network (LAN). The connection I/F 16 is an interface for connecting the main unit 10 to the operation unit 20 via the communication path 300. The engine 17 is hardware that performs general-purpose information processing and processing other than communication to implement the copy function, the scanner function, the facsimile function, and the printer function. The engine 17 includes a scanner (image reader) that reads an image on a document, a plotter (image forming unit) that prints an image on a sheet material such as a paper, and a fax that performs fax communication. Further, the engine 17 can include a finisher that sorts a printed sheet material and an automatic document feeder (ADF) that automatically feeds the document. The system bus 18 connects the CPU 11, the ROM 12, the RAM 13, the HDD 14, the communication I/F 15, the connection I/F 16, and the engine 17 to one another.

The operation unit 20 includes a CPU 21, a ROM 22, a RAM 23, a flash memory 24, an external connection I/F 25, a connection I/F 26, an operation panel 27, a communication I/F 28, and a system bus 29.

The CPU 21 generally controls the operation of the operation unit 20. The CPU 21 executes a program stored in the ROM 22 or the flash memory 24, using the RAM 23 as a work area, to control entire operation of the operation unit 20 to implement various functions such as display of information (an image) according to an input received from the user.

The external connection I/F 25 is an interface for connecting the operation unit 20 to a peripheral device 31 (an image processing device such as a camera, a voice input/output device such as a microphone or a speaker, a card reader, a card writer, or the like). The connection I/F 26 is an interface for connecting the operation unit 20 to the main unit 10 via the communication path 300. The communication I/F 28 is an interface for connecting the operation unit to the network 30. The system bus 29 connects the CPU 21, the ROM 22, the RAM 23, the flash memory 24, the external connection I/F 25, the connection I/F 26, the operation panel 27, and the communication I/F 28 to one another.

The operation panel 27 receives various inputs according to operations of the user, and displays various types of information (for example, information according to a received operation, information indicating an operation status of the MFP 1, information indicating a set state, and the like). The operation panel 27 is, but not limited to, a liquid crystal display device (LCD) having a touch panel mounted, or an organic electro luminescence (EL) display device having a touch panel mounted, for example. Further, the operation unit 20 may include an operation unit such as a hardware key and a display such as a lamp in addition to or in place of the touch panel.

Note that the server 2 may be an arbitrary computer having a CPU, a ROM, a RAM, an HDD, and a communication I/F. The server 2 communicates with the MFP 1 connected to the network 30 via the communication I/F. The CPU executes a program stored in the ROM or the HDD using the RAM as a work area to implement the functions of the server 2.

Figure 2:
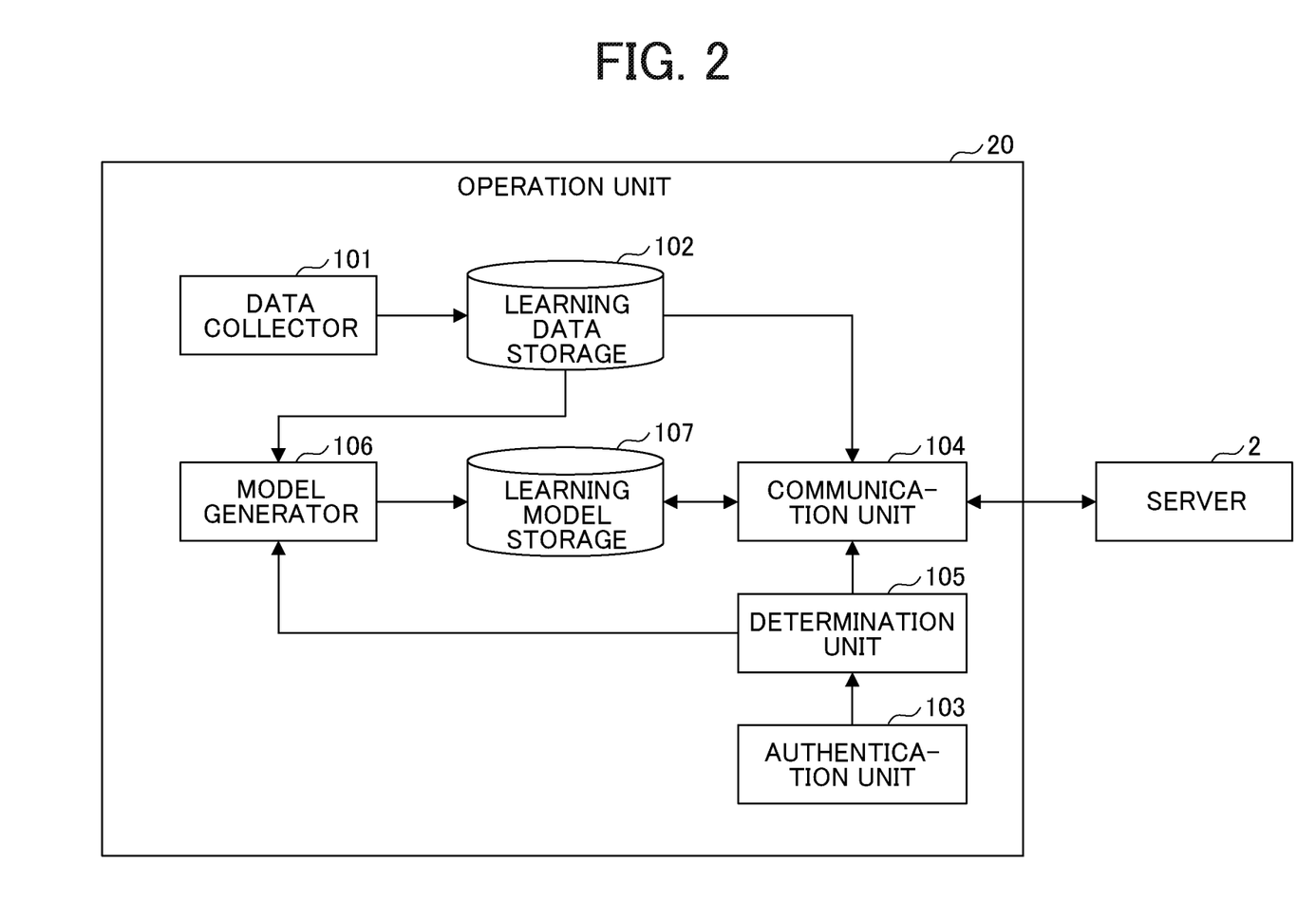
FIG. 2 is a diagram illustrating an example of a functional configuration of an operation unit, according to an embodiment of the present disclosure.

Next, a functional configuration of the operation unit 20 (MFP 1) will be described. FIG. 2 is a diagram illustrating an example of a functional configuration of the operation unit 20. The operation unit 20 illustrated in FIG. 2 includes a data collector 101, a learning data storage 102, an authentication unit 103, a communication unit 104, a determination unit 105, a model generator 106, and a learning model storage 107. These functional configurations are implemented by the CPU 21 executing a program and cooperating with other hardware. The learning data storage 102 is provided on the ROM 22, the RAM 23, or the flash memory 24. The learning model storage 107 is provided on the flash memory 24.

The data collector 101 collects learning data from each of the elements of the MFP 1. The learning data is any data as a target of machine learning used for improving the setting and operation of the MFP 1. The learning data includes setting data and job history data of the MFP 1. The setting data is data related to settings of the MFP 1, and includes data indicating setting of parameters at the time of execution of a job, and data indicating display settings of icons or the like on the operation panel 27. The job history data is data regarding an execution history of a job, and includes data indicating job execution date and time, a login user, a job type, and the like. The data collector 101 collects the learning data periodically or at predetermined timing. The predetermined timing is, but not limited to, at the time of start of the operation unit 20, at the time of update of the learning data, at the time of login by the user, or at the time of logout by the user, for example.

The learning data storage 102 stores the learning data collected by the data collector 101.

The authentication unit 103 authenticates the user on the basis of user information input from the user at the time of login by the user to the operation unit 20 (MFP 1). The user information includes user identification information (user ID), a user name, a password, and the like. The user information can be input from the operation panel 27 or can be input from the peripheral device 31 such as a card reader. As an authentication, server authentication or machine authentication can be used. The server authentication is a method for authenticating the user by comparing the input user information with user information stored in an authentication server, and is applied to authentication of the user who uses a plurality of the MFPs 1 included in the image forming system. In the present embodiment, for example, the server 2 can have the authentication server function. In another example, the MFP 1 communicates with an authentication server provided separately from the server 2. On the other hand, the machine authentication is a method for authenticating the user by comparing the input user information with user information registered in the operation unit 20, and is applied to authentication of the user who uses the MFP 1 to which the user information has been input.

The communication unit 104 communicates with the server 2 to exchange data.

The determination unit 105 determines whether to generate a learning model by the model generator 106 or to generate a learning model by the server 2 on the basis of at least one of the authentication method at the time of login by the user, a hardware resource specification of the operation unit 20, and a connection method between the MFP 1 and the server 2. The determination unit 105 makes the above determination periodically or at predetermined timing. The predetermined timing is, but not limited to, at the time of start of the operation unit 20, at the time of update of the learning data, at the time of login by the user, or at the time of logout by the user, for example. The detail of the determination by the determination unit 105 will be described below.

The model generator 106 generates the learning model from learning data by machine learning. The model generator 106 can use an arbitrary learning method such as support vector machine (SVM), clustering, neural network, decision tree, or the like. The learning model is, but not limited to, a model for estimating settings of optimal parameters at the time of executing a job according to the user or a model for estimating an optimum arrangement of icons or the like on the operation panel 27 according to the user, for example.

The learning model storage 107 stores the learning model generated by the model generator 106. The MFP 1 sets parameters and executes operations according to the learning model stored in the learning model storage 107.

The server 2 according to the present embodiment has the same or substantially the same function as that of the model generator 106. In other words, the server 2 can generate a learning model from learning data by machine learning. The learning method used by the model generator 106 and the learning method used by the server 2 may be the same or different.

Figure 3:
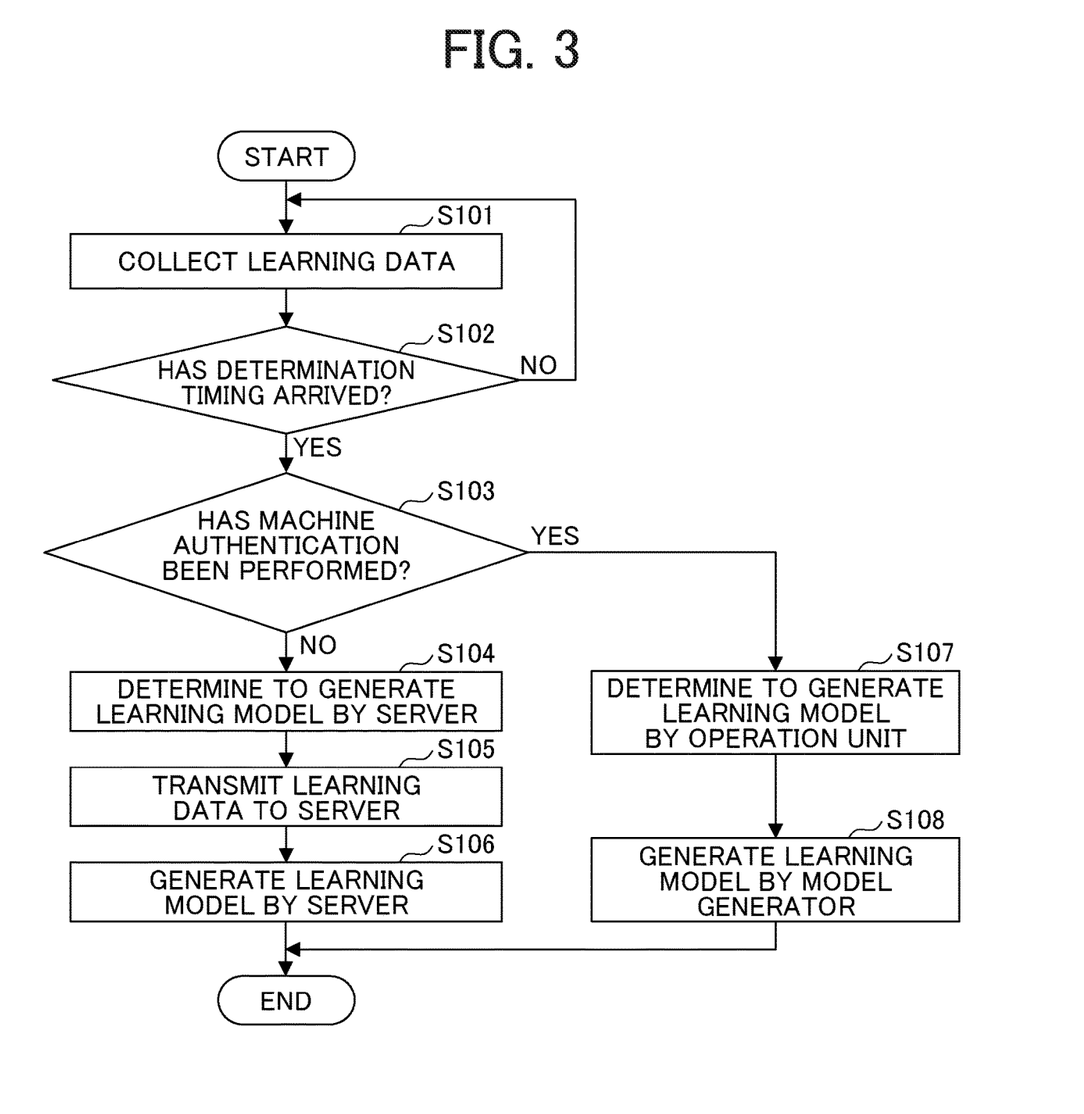
FIG. 3 is a flowchart illustrating an example of an operation by the image forming system, according to an embodiment of the present disclosure.
Figure 4:
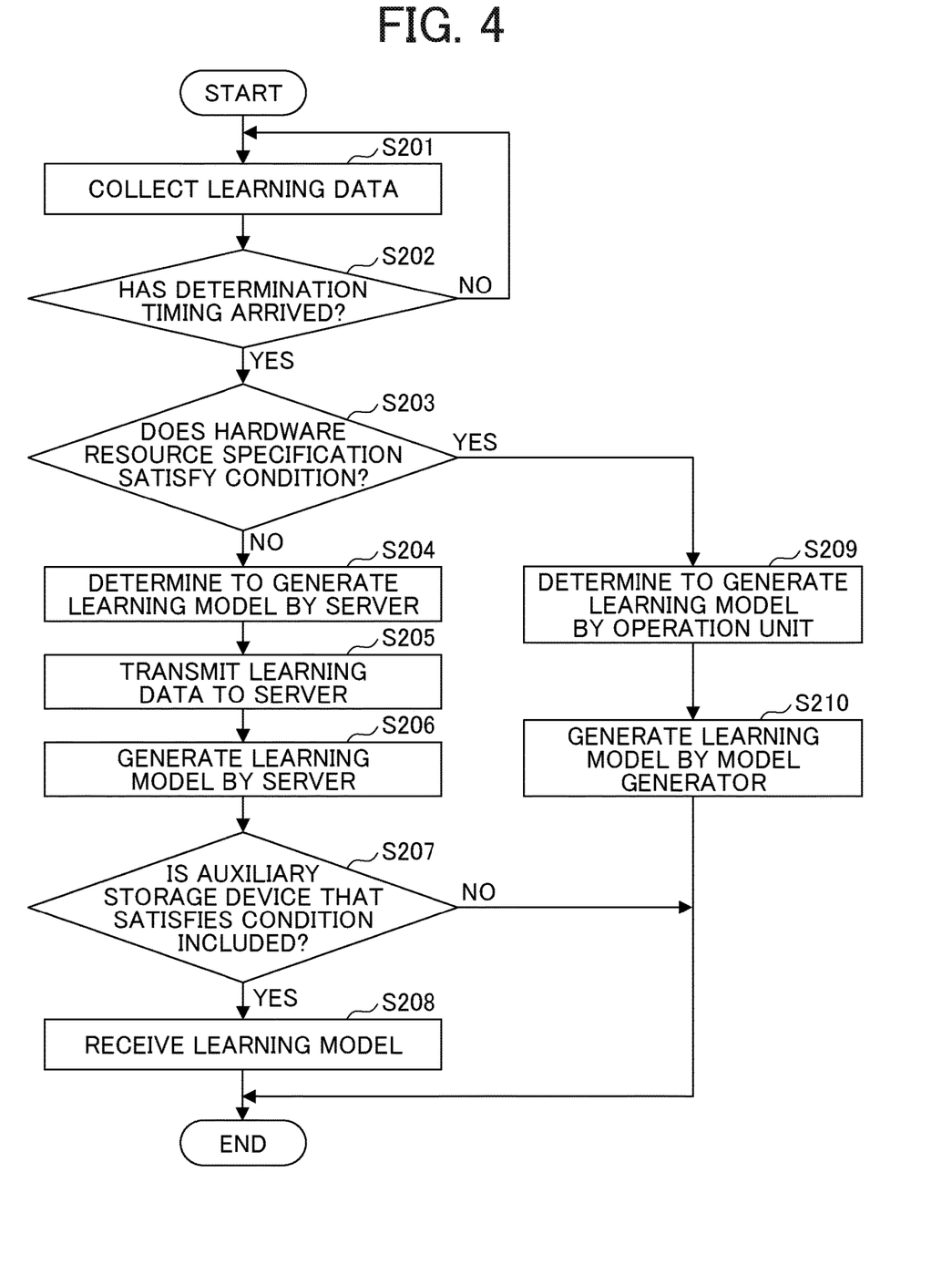
FIG. 4 is a flowchart illustrating an example of an operation by the image forming system, according to an embodiment of the present disclosure.
Figure 5:
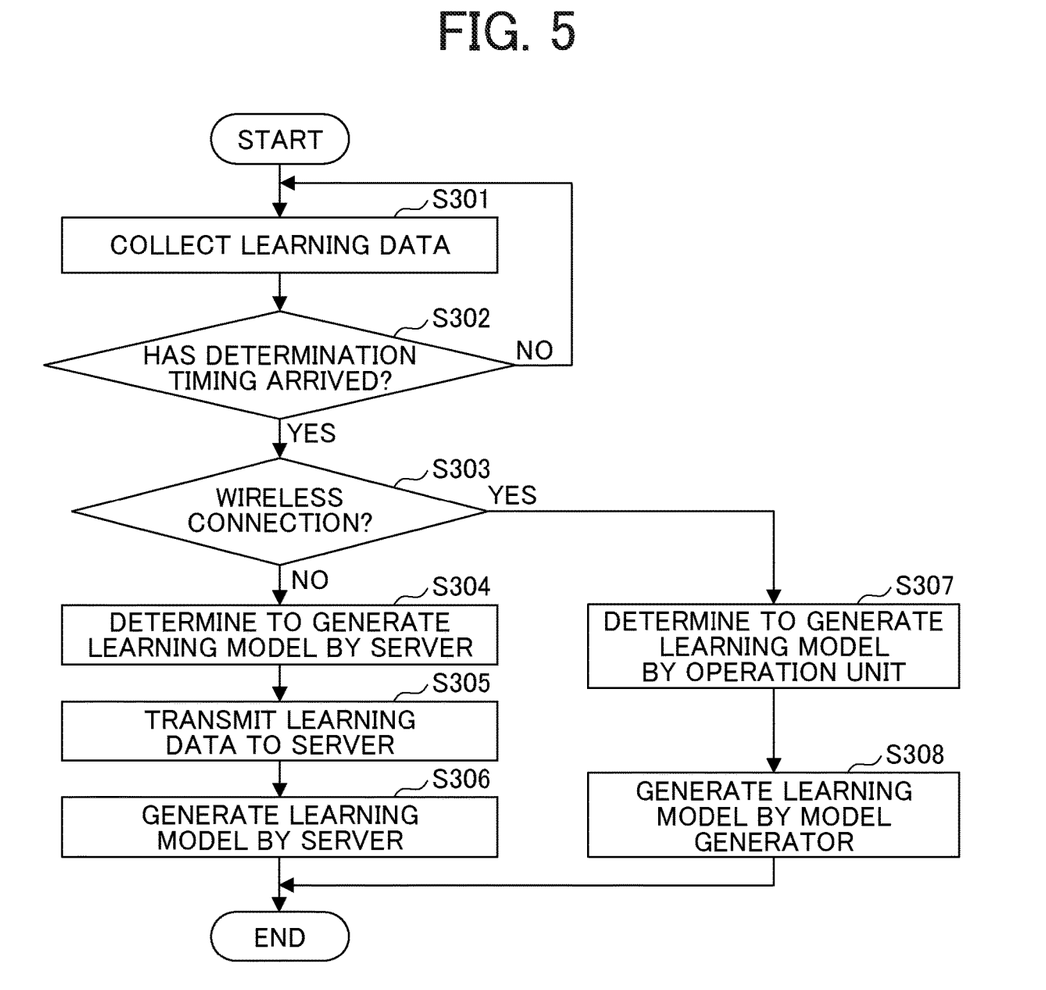
FIG. 5 is a flowchart illustrating an example of an operation of the image forming system, according to an embodiment of the present disclosure.

Next, the operation by the image forming system according to the present embodiment will be described. FIGS. 3 to 5 are flowcharts illustrating examples of the operation of the image forming system.

FIG. 3 is a flowchart illustrating an example of the operation of the operation unit 20 in a case where the determination unit 105 determines whether to generate a learning model by the model generator 106 or to generate a learning model by the server 2 on the basis of how authentication is performed at the time of login by the user.

First, the data collector 101 of the operation unit 20 collects the learning data (step S101). The data collector 101 stores the collected learning data in the learning data storage 102. The data collector 101 repeats collection of the learning data periodically or at predetermined timing until determination timing by the determination unit 105 arrives (step S102: NO). In the example of FIG. 3, it is assumed that the determination timing is the time of logout by the user.

When the determination timing arrives (step S102: YES), the determination unit 105 acquires information indicating how the authentication has been performed (the authentication method) at the time of login by the user from the authentication unit 103 and confirms whether the acquired authentication method is the machine authentication (step S103).

In a case where the authentication method is not the machine authentication (step S103: NO), that is, in a case where the authentication method is the server authentication, the determination unit 105 determines to generate the learning model by the server 2 (step S104) and requests the communication unit 104 to transmit the learning data. When transmission of the learning data is requested, the communication unit 104 reads the learning data from the learning data storage 102 and transmits the learning data to the server 2 (step S105).

In response to receiving the learning data, the server 2 generates the learning model from the received learning data by a predetermined learning method (step S106), and stores the generated learning model. Thus, the learning model to applied to a user who uses the plurality of MFPs 1 can be generated using the learning data received from the plurality of MFPs 1 and stored in the server 2.

Thereafter, when the user logs in to the operation unit 20 using the server authentication, the operation unit 20 receives the learning model from the server 2 and sets parameters and executes operations according to the learning model.

By contrast, in a case where the authentication method is the machine authentication (step S103: YES), the determination unit 105 determines to generate the learning model by the model generator 106 (step S107) and requests the model generator 106 to generate the learning model. When generation of the learning model is requested, the model generator 106 reads the learning data from the learning data storage 102 and generates the learning model from the learning data using a predetermined learning method (step S108). The model generator 106 stores the generated learning model in the learning model storage 107.

Thereafter, when the user logs in to the operation unit 20 using the machine authentication, the operation unit 20 reads the learning model from the learning model storage 107 and sets parameters and executes operations according to the learning model.

As described heretofore, in the example of FIG. 3, determination as to whether to generate a learning model by the model generator 106 or to generate a learning model by the server 2 is made on the basis of the authentication method at the time of login by the user, and the learning model generation processing is distributed between the operation unit 20 and the server 2.

In the example of FIG. 3, the server 2 can transmit the learning model to the operation unit 20 after generating the learning model. In this case, the communication unit 104 of the operation unit 20 only has to store the learning model received from the server 2 in the learning model storage 107. This saves the time required for receiving the learning model from the server 2 when the user logs in using the server authentication. Accordingly, the login processing can be simplified.

FIG. 4 is a flowchart illustrating an example of the operation by the operation unit 20 in a case where the determination unit 105 determines whether to generate a learning model by the model generator 106 or to generate a learning model by the server 2 on the basis of the hardware resource specification of the operation unit 20.

First, the data collector 101 of the operation unit 20 collects the learning data (step S201). The data collector 101 stores the collected learning data in the learning data storage 102. The data collector 101 repeats collection of the learning data periodically or at predetermined timing until determination timing by the determination unit 105 arrives (step S202: NO). In the example of FIG. 4, the determination timing is arbitrary.

When the determination timing arrives (step S202: YES), the determination unit 105 reads the hardware resource specification from the ROM 22 or the flash memory 24 and confirms whether the read hardware resource specification satisfies a predetermined condition (step S203). The hardware resource specification is, but not limited to, processing speed (the number of clocks) of the CPU 21, the number of cores, the type of the CPU 21, and the capacity of the RAM 23, for example. The predetermined condition is a condition of a sufficient specification for executing the learning model generation processing. The predetermined condition is that, but not limited to, for example, the processing speed of the CPU 21, the number of cores, and the capacity of the RAM 23 are equal to or larger than threshold values, and the type of the CPU 21 is a predetermined type.

In a case where the hardware resource specification does not satisfy the condition (step S203: NO), that is, in a case where the hardware resource specification of the operation unit 20 is insufficient for the learning model generation processing, the determination unit 105 determines to generate the learning model by the server 2 (step S204) and requests the communication unit 104 to transmit learning data. When transmission of the learning data is requested, the communication unit 104 reads the learning data from the learning data storage 102 and transmits the learning data to the server 2 (step S205).

In response to receiving the learning data, the server 2 generates the learning model from the received learning data by a predetermined learning method (step S206), and stores the generated learning model. Thus, the learning model to be applied to the user who uses the plurality of MFPs 1 can be generated using the learning data received from the plurality of MFPs 1 and stored in the server 2.

After transmitting the learning data to the server 2, the communication unit 104 reads the hardware resource specification from the ROM 22 or the flash memory 24, and confirms whether the operation unit 20 includes an auxiliary storage device (an HDD, a flash memory, or the like) that satisfies a condition (step S207). The condition is that, but not limited to, a free space is equal to or larger than a threshold value.

In a case where the operation unit 20 does not include an auxiliary storage device that satisfies the condition (step S207: NO), the communication unit 104 ends the processing. In other words, in a case where there is not enough free space in the auxiliary storage device, storage of the learning model is not performed. This resolves shortage of the free space of the auxiliary storage device due to storage of the learning model. Thereafter, the operation unit 20 receives the learning model from the server 2, and sets parameters and executes operations according to the learning model.

By contrast, in a case where the operation unit 20 includes an auxiliary storage device that satisfies the condition (step S207: YES), the communication unit 104 requests the server 2 to transmit the learning model. When the learning model is requested, the server 2 transmits the learning model to the operation unit 20. When the server 2 transmits the learning model, the communication unit 104 of the operation unit 20 receives the learning model (step S208) and stores the learning model in the learning model storage 107. This saves the time required for receiving the learning model from the server 2 when the operation unit 20 uses the learning model. Accordingly, the processing can be simplified. Thereafter, the operation unit 20 reads the learning model from the learning model storage 107, and sets parameters and executes operations according to the learning model.

By contrast, in a case where the hardware resource specification satisfies the condition (step S203: YES), the determination unit 105 determines to generate the learning model by the model generator 106 (step S209) and requests the model generator 106 to generate the learning model. When generation of the learning model is requested, the model generator 106 reads the learning data from the learning data storage 102 and generates the learning model from the learning data using a predetermined learning method (step S210). The model generator 106 stores the generated learning model in the learning model storage 107.

Thereafter, the operation unit 20 reads the learning model from the learning model storage 107, and sets parameters and executes operations according to the learning model. As described heretofore, in the example of FIG. 4, determination as to whether to generate a learning model by the model generator 106 or to generate a learning model by the server 2 is made on the basis of the hardware resource specification of the operation unit 20, and the learning model generation processing is distributed between the operation unit 20 and the server 2.

FIG. 5 is a flowchart illustrating an example of the operation of the operation unit 20 in a case where the determination unit 105 determines whether to generate a learning model by the model generator 106 or to generate a learning model by the server 2 on the basis of the connection method between the MFP 1 and the server 2.

First, the data collector 101 of the operation unit 20 collects the learning data (step S301). The data collector 101 stores the collected learning data in the learning data storage 102. The data collector 101 repeats collection of the learning data periodically or at predetermined timing until determination timing by the determination unit 105 arrives (step S302: NO). In the example of FIG. 5, the determination timing is arbitrary.

When the determination timing arrives (step S302: YES), the determination unit 105 acquires the connection method between the MFP 1 and the server 2 from the communication unit 104, and confirms whether the acquired connection method is wireless connection (step S303).

In a case where the connection method is not the wireless connection (step S303: NO), that is, in a case where the connection method is the wired connection, the determination unit 105 determines to generate the learning model by the server 2 (step S304) and requests the communication unit 104 to transmit the learning data. When transmission of the learning data is requested, the communication unit 104 reads the learning data from the learning data storage 102 and transmits the learning data to the server 2 (step S305).

In response to receiving the learning data, the server 2 generates the learning model from the learning data by a predetermined learning method (step S306), and stores the generated learning model. Thus, the learning model to be applied to the user who uses the plurality of MFPs 1 can be generated using the learning data received from the plurality of MFPs 1 and stored in the server 2.

Thereafter, when the user logs in to the operation unit 20 using the server authentication, the operation unit 20 receives the learning model from the server 2 and sets parameters and executes operations according to the learning model.

By contrast, in a case where the connection method is the wireless connection (step S303: YES), the determination unit 105 determines to generate the learning model by the model generator 106 (step S307) and requests the model generator 106 to generate the learning model. When generation of the learning model is requested, the model generator 106 reads the learning data from the learning data storage 102 and generates the learning model from the learning data using a predetermined learning method (step S308). The model generator 106 stores the generated learning model in the learning model storage 107.

Thereafter, when the user logs in to the operation unit 20 using the machine authentication, the operation unit 20 reads the learning model from the learning model storage 107 and sets parameters and executes operations according to the learning model.

As described heretofore, in the example of FIG. 5, determination as to whether to generate a learning model by the model generator 106 or to generate a learning model by the server 2 is made on the basis of the connection method between the MFP 1 and the server 2, and the learning model generation processing is distributed between the operation unit 20 and the server 2.

In the example of FIG. 5, the server 2 can transmit the learning model to the operation unit 20 after generating the learning model. In this case, the communication unit 104 of the operation unit 20 only has to store the learning model received from the server 2 in the learning model storage 107. This saves the time required for receiving the learning model from the server 2 when the operation unit 20 uses the learning model. Accordingly, the processing can be simplified.

As described heretofore, according to the present embodiment, the learning model generation processing can be distributed between the operation unit 20 and the server 2. Therefore, the load by the machine learning executed when the learning model is generated is distributed between the operation unit 20 and the server 2, and loads on the operation unit 20 and the server 2 can be reduced.

Second Embodiment

An image forming system according to a second embodiment will be described with reference to FIGS. 6 and 7. Hereinafter, differences from the first embodiment will be mainly described.

In the present embodiment, in a case where an operation unit 20 does not receive an operation from a user for a predetermined period, the operation unit 20 automatically transitions to an energy saving mode. The energy saving mode is an operation state in which power consumption of the operation unit 20 is low. The operation unit 20 receives only an operation from the user during the energy saving mode. In a case where the operation unit 20 receives the operation from the user during the energy saving mode, the operation unit 20 transitions to a normal mode. The normal mode is a normal operation state of the operation unit 20, and processing according to the operation from the user is executed.

The data collector 101 stores, as the learning data, start time and end time of the energy saving mode (hereinafter referred to as "energy saving data") and other data such as setting data and job history data of the MFP 1 (hereinafter referred to as "other learning data"). The model generator 106 generates the learning model for estimating a period of the energy saving mode (hereinafter referred to as "energy saving model") on the basis of the energy saving data, and stores the energy saving model in the learning model storage 107. The server 2 generates a learning model for improving the settings and operations of the MFP 1 (hereinafter referred to as "another learning model") different from the energy saving model on the basis of the other learning data. The another learning model mentioned here is the same or substantially the same as the learning model generated in the first embodiment. The learning method used by the model generator 106 and the learning method used by the server 2 may be the same or different. Further, the determination unit 105 determines whether to generate the another learning model in the server 2 on the basis of the energy saving model.

The operation of the image forming system according to the present embodiment will be described. FIGS. 6 and 7 are flowcharts illustrating examples of the operation by the image forming system.

Figure 6:
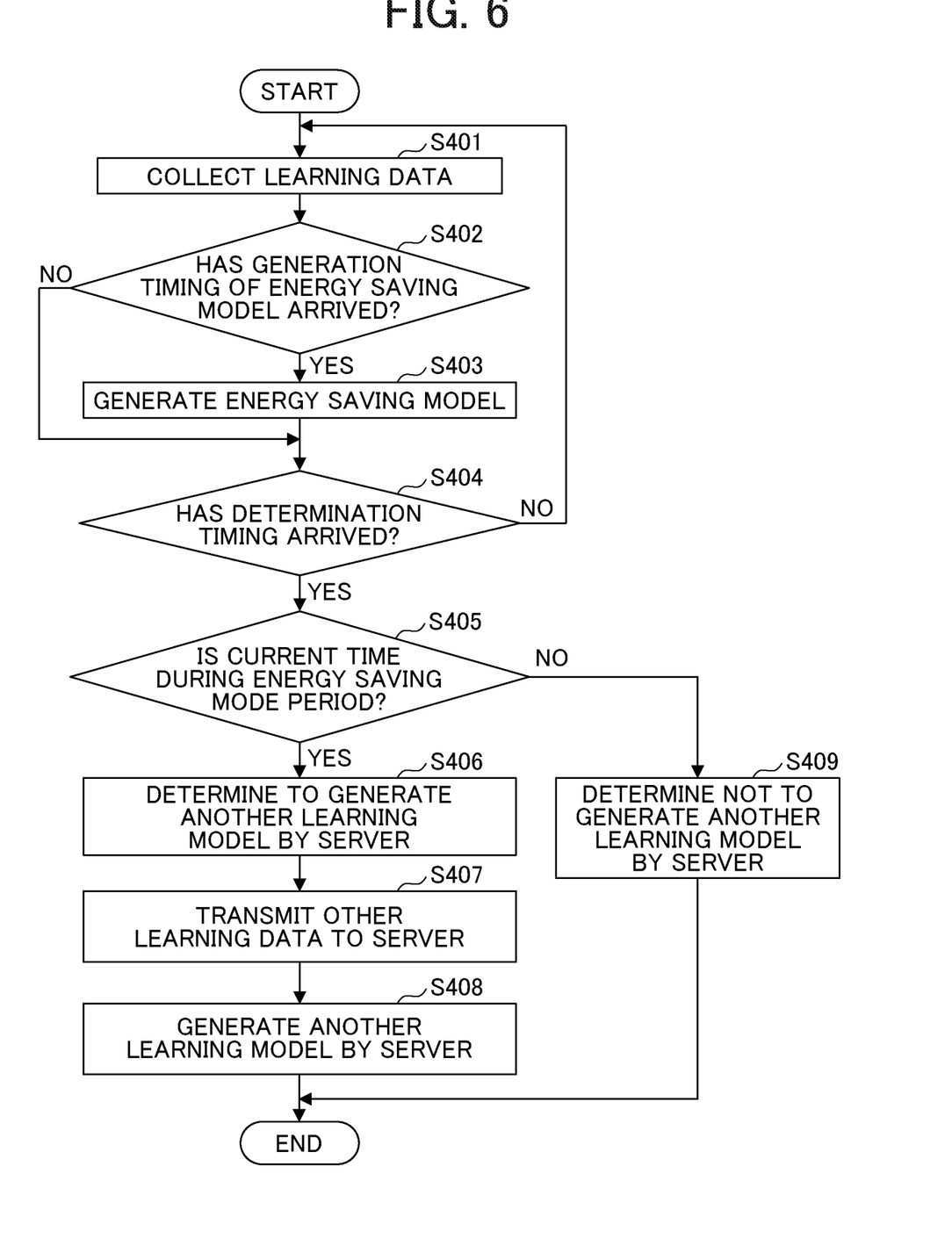
FIG. 6 is a flowchart illustrating an example of an operation of the image forming system, according to an embodiment of the present disclosure.

FIG. 6 is a flowchart illustrating an example of the operation by the operation unit 20 in a case where the communication unit 104 transmits the other learning data to the server 2 in an energy saving mode period.

First, the data collector 101 of the operation unit 20 collects learning data including the energy saving data and the other learning data (step S401). The data collector 101 stores the collected learning data in a learning data storage 102. The data collector 101 repeats collection of the learning data periodically or at predetermined timing until determination timing by the determination unit 105 arrives (step S404: NO). In the example of FIG. 6, the determination timing is arbitrary.

When the generation timing of the energy saving model arrives before the arrival of the determination timing (step S402: YES), the model generator 106 reads the energy saving data from the learning data storage 102, and generates the energy saving model from the energy saving data by a predetermined learning method (step S403). The model generator 106 stores the generated energy saving model in the learning model storage 107.

Further, when the determination timing arrives (step S404: YES), the determination unit 105 reads the energy saving model from the learning model storage 107 and determines whether the current time is in the energy saving mode period (step S405).

When the determination unit 105 determines that the current time is not in the energy saving mode period (step S405: NO), the determination unit 105 determines not to generate the another learning model by the server 2 (step S409) and ends the processing. As a result, the other learning data is not transmitted from the operation unit 20 to the server 2 during use of the operation unit 20 by the user.

By contrast, in a case where the determination unit 105 determines that the current time is in the energy saving mode period (step S405: YES), the determination unit 105 determines to generate the another learning model by the server 2 (step S406) and requests the communication unit 104 to transmit the other learning data. When transmission of the other learning data is requested, the communication unit 104 reads the other learning data from the learning data storage 102 and transmits the other learning data to the server 2 (step S407).

In response to receiving the other learning data, the server 2 generates the another learning model from the other learning data by a predetermined learning method (step S408), and stores the generated another learning model. Thus, the other learning data can be transmitted from the operation unit 20 to the server 2 and the another learning model can be generated during non-use of the operation unit 20 by the user.

Thereafter, the operation unit 20 receives the learning model from the server 2, and sets parameters and executes operations according to the learning model.

As described heretofore, in the example of FIG. 6, the energy saving model generation processing and the another learning model generation processing are distributed between the operation unit 20 and the server 2. Further, determination as to whether the current time is in the energy saving mode period is made on the basis of the energy saving model, and the other learning data is transmitted from the operation unit 20 to the server 2 in the energy saving mode period (in the period in which the user does not use the operation unit 20).

In the example of FIG. 6, the server 2 can transmit the another learning model to the operation unit 20 after generating the another learning model. In this case, the communication unit 104 of the operation unit 20 only has to store the another learning model received from the server 2 in the learning model storage 107. This saves the time period required for receiving the learning model from the server 2, when the operation unit 20 uses the learning model. Accordingly, the processing can be simplified.

Figure 7:
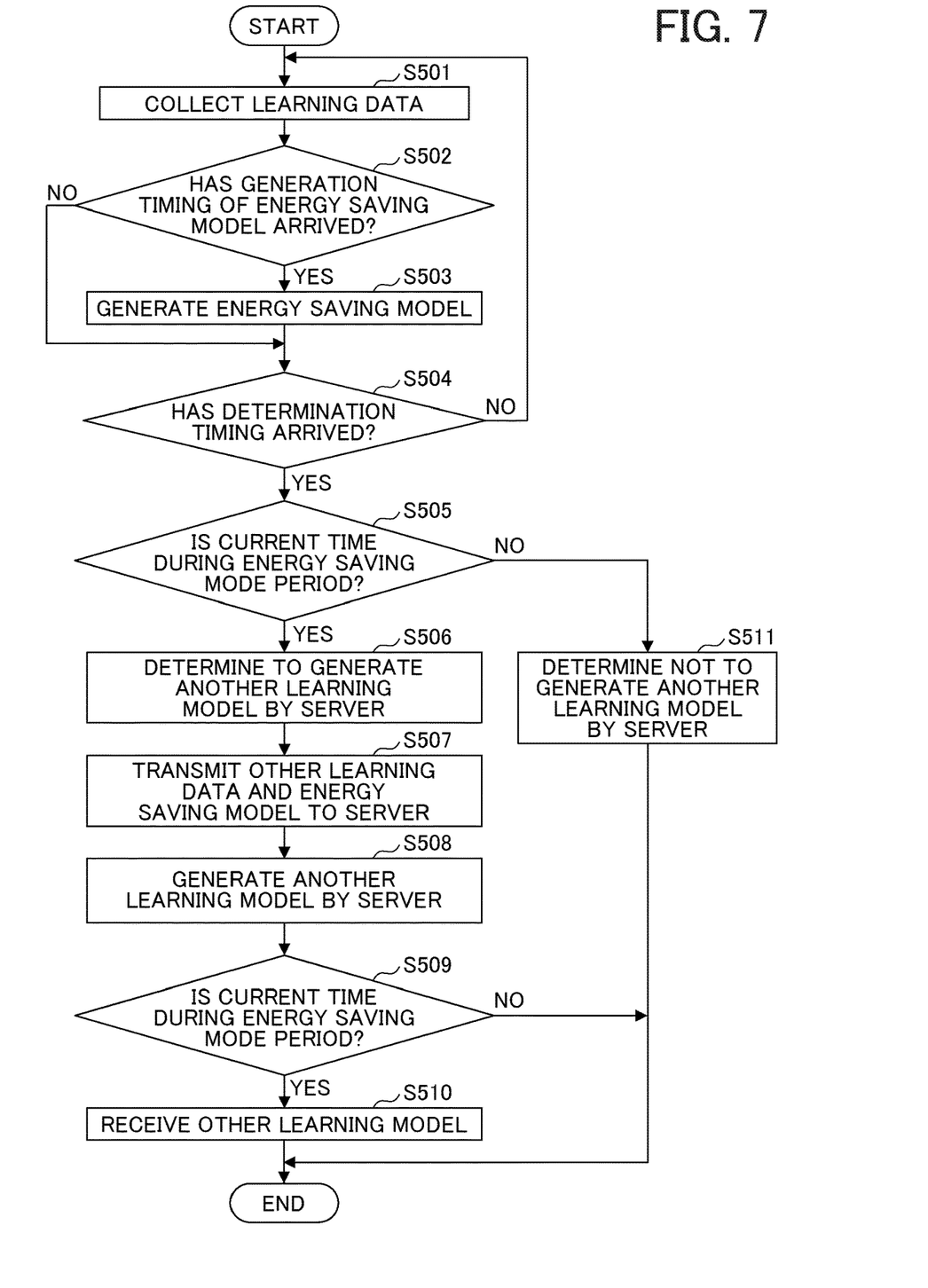
FIG. 7 is a flowchart illustrating an example of an operation of the image forming system, according to an embodiment of the present disclosure.

FIG. 7 is a flowchart illustrating an example of the operation by the operation unit 20 in a case where the communication unit 104 transmits the other learning data to the server 2 in the energy saving mode period. Steps S501 to S506 and S511 are the same or substantially the same as steps S401 to S406 and S409 in FIG. 6, and thus the redundant description thereof is omitted.

When the determination unit 105 determines that the current time is in the energy saving mode period (step S505: YES), the determination unit 105 determines to generate the another learning model by the server 2 (step S506) and requests the communication unit 104 to transmit the other learning data. When transmission of the other learning data is requested, the communication unit 104 reads the other learning data from the learning data storage 102 and reads the energy saving model from the learning model storage 107, and transmits the other learning data and the energy saving model to the server 2 (step S507).

In response to receiving the other learning data, the server 2 generates the another learning model from the other learning data by a predetermined learning method (step S508), and stores the generated another learning model. Thus, the other learning data can be transmitted from the operation unit 20 to the server 2 and the another learning model can be generated during non-use of the operation unit 20 by the user. Thereafter, the operation unit 20 receives the learning model from the server 2, and sets parameters and executes operations according to the learning model.

After generation of the another learning model, the server 2 determines whether the current time is in the energy saving mode period on the basis of the energy saving model received from the communication unit 104 (step S509).

When the determination unit 105 determines that the current time is not in the energy saving mode period (step S509: NO), the processing ends.

By contrast, in a case where the determination unit 105 determines that the current time is in the energy saving mode period (step S509: YES), the server 2 transmits the generated another learning model to the operation unit 20. When the server 2 transmits the another learning model, the communication unit 104 of the operation unit 20 receives the another learning model (step S510) and stores the another learning model in the learning model storage 107. This saves the time required for receiving the another learning model from the server 2, when the operation unit 20 uses the another learning model. Accordingly, the processing can be simplified. Thereafter, the operation unit 20 reads the another learning model from the learning model storage 107, and sets parameters and executes operations according to the another learning model.

In this way, in the example of FIG. 7, the energy saving model generation processing and the another learning model generation processing are distributed between the operation unit 20 and the server 2. Further, determination as to whether the current time is in the energy saving mode period is made on the basis of the energy saving model, the other learning data is transmitted from the operation unit 20 to the server 2 in the energy saving mode period (in the period in which the user does not use the operation unit 20), and the another learning model is transmitted from the server 2 to the operation unit 20.

As described above, according to the present embodiment, the learning model generation processing can be distributed between the operation unit 20 and the server 2. Therefore, the load by the machine learning executed when the learning model is generated is distributed between the operation unit 20 and the server 2, and loads on the operation unit 20 and the server 2 can be reduced.

Further, according to the present embodiment, communication between the operation unit 20 and the server 2 can be executed in the energy saving mode period. Therefore, a delay of the processing due to increase in the load on the operation unit 20 is prevented during the use of the operation unit 20 by the user.

A conventional image forming apparatus generates a learning model by machine learning inside the image forming apparatus, and a load on the image forming apparatus is heavy. Further, in a case where the machine learning is executed in a server, a load on the server becomes larger as the number of image forming apparatuses connected to the server becomes larger.

According to one or more embodiments of the present disclosure, the load by the machine learning in the image forming system can be distributed.

Note that the above-described functions of the embodiments can be implemented by one or a plurality of processing circuits. Here, the "processing circuit" in the present specification includes a processor programmed to execute the functions by software, such as a processor implemented by an electronic circuit, and an application specific integrated Circuit (ASIC) designed to execute the above-described functions, a digital signal processor (DSP), a field programmable gate array (FPGA), and devices such as conventional circuit modules.

Further, the present disclosure is not limited to the configurations described in the above embodiments, combinations of the configurations with other elements, and the like. These points can be changed within a range not departing from the gist of the present disclosure and can be appropriately determined according to an application form.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus, comprising:
a communication interface configured to communicate with a server; and circuitry configured to
  collect learning data, and
  determine whether to generate a first learning model by the server or to generate the first learning model by the circuitry based on at least one of
    a user authentication method, wherein the circuitry is configured to determine to generate the first learning model by the circuitry in response to the user authentication being performed by the image forming apparatus, and the circuitry is configured to determine to generate the first learning model by the server in response to the user authentication being performed by the server, or
    a connection method between the image forming apparatus and the server wherein the connection method is one of a wired connection or a wireless connection, and the circuitry is configured to
      determine to generate the first learning model by the circuitry in response to the connection method being the wireless connection, and
      determine to generate the first learning model by the server in response to the connection method being the wired connection.

2. The image forming apparatus according to claim 1, wherein
  the learning data includes at least one of setting data or job history data, and
  the circuitry is further configured to generate the first learning model based on the at least one of the setting data or the job history data.

3. The image forming apparatus according to claim 1, wherein the circuitry is further configured to:
  generate the first learning model in response to a determination to generate the first learning model by the circuitry, and
  transmit the learning data to the server via the communication interface in response to a determination to generate the first learning model by the server.

4. The image forming apparatus according to claim 1, wherein
  the learning data includes
    at least one of setting data or job history data, and
    a start time and an end time of an energy saving mode, and
  the circuitry is further configured to generate a second learning model based on the start time and the end time of the energy saving mode.

5. The image forming apparatus according to claim 4, wherein
  the circuitry is further configured to determine whether to generate the first learning model by the server based on the second learning model, and
  wherein the first learning model is generated based on the at least one of the setting data and the job history data.

6. The image forming apparatus according to claim 4, wherein the circuitry is further configured to:
  transmit the at least one of the setting data or the job history data to the server via the communication interface, in response to a determination to generate the first learning model by the server.

7. An image forming system comprising:
an image forming apparatus; and
a server,
the image forming apparatus including
  a communication interface configured to communicate with the server; and
  circuitry configured to
    collect learning data, and
    determine whether to generate a learning model by the server or to generate the learning model by the circuitry based on at least one of
      a user authentication method, wherein the circuitry is configured to determine to generate the learning model by the circuitry in response to the user authentication being performed by the image forming apparatus, and the circuitry is configured to determine to generate the learning model by the server in response to the user authentication being performed by the server, or
      a connection method between the image forming apparatus and the server wherein the connection method is one of a wired connection or a wireless connection, and the circuitry is configured to
        determine to generate the learning model by the circuitry in response to the connection method being the wireless connection, and
        determine to generate the learning model by the server in response to the connection method being the wired connection.

8. The image forming apparatus according to claim 1, wherein
  the circuitry is further configured to:
    determine whether the image forming apparatus includes a memory including free space equal to or larger than a threshold, in response to a determination to generate the first learning model by the server,
    store the first learning model in the memory in response to a determination that image the forming apparatus includes the memory including free space equal to or larger than the threshold.

9. The image forming apparatus according to claim 1, wherein the circuitry is further configured to:
  determine whether to generate the first learning model by the server or to generate the first learning model by the circuitry at a given time, wherein the given time is at least one of
    a start of the image forming apparatus,
    an update of the learning data,
    a user login, or
    a user logout.

10. The image forming apparatus according to claim 2, wherein the circuitry is further configured to:
  generate the first learning model using at least one of support vector machine (SVM), clustering, neural network, or decision tree.

* * * * *